J. H. HAMMOND, Jr.
SYSTEM FOR CONTROL OF MOVING BODIES BY RADIANT ENERGY.
APPLICATION FILED JUNE 22, 1914. RENEWED MAY 3, 1922.

1,418,791.

Patented June 6, 1922.
2 SHEETS—SHEET 1.

Witnesses:
Horace A. Crossman
Carl L. Choate.

Inventor:
John Hays Hammond Jr.

UNITED STATES PATENT OFFICE.

JOHN HAYS HAMMOND, JR., OF GLOUCESTER, MASSACHUSETTS.

SYSTEM FOR CONTROL OF MOVING BODIES BY RADIANT ENERGY.

1,418,791. Specification of Letters Patent. Patented June 6, 1922.

Application filed June 22, 1914, Serial No. 846,468. Renewed May 3, 1922. Serial No. 558,310.

*To all whom it may concern:*

Be it known that I, JOHN HAYS HAMMOND, Jr., a citizen of the United States, and a resident of Gloucester, in the county of Essex and State of Massachusetts, have invented an Improvement in Systems for Control of Moving Bodies by Radiant Energy, of which the following description, in connection with the accompanying drawings, is a specification, like characters on the drawings representing like parts.

This invention relates to systems for controlling and operating moving bodies or mechanisms at a distance and more particularly to systems in which pneumatic, hydraulic or other fluid pressure or vacuum controlled mechanism for operating the steering gear, engine or other functioning or controlling device or mechanism of moving bodies, is controlled by radiant energy transmitted from a distant station.

Within the scope and purpose of the invention the moving body may be of any suitable type, such for example as a vessel, vehicle or aircraft. I have chosen for illustration the application of my invention to the steering of a torpedo boat or like vessel.

In the accompanying drawings, wherein is disclosed a single embodiment of my invention.

My invention particularly relates to the control of vessels from a distance by radiant energy, preferably in the form of electromagnetic waves, though other types of moving bodies may be so controlled, and, within the scope of the invention, other forms of radiant energy may be employed, such, for example, as light or sound waves. In accordance with the disclosed embodiment of the invention, I provide means whereby the steering apparatus can be controlled or governed at a distance by radiant energy, and whereby the vessel may be kept upon a predetermined course at other times by a gyroscope or other suitable controller or azimuth-maintaining means located upon the vessel.

During the periods when the vessel is not under the control of an operator at the distant control station, it is maintained upon its course by a suitable controller or azimuth-maintaining means which is herein typified as a gyroscope. The said controller, which I will hereinafter refer to as a gyroscope, may be permitted to function in any suitable manner in maintaining the vessel upon its course, but preferably I employ fluid under pressure, such for example as compressed air, and through the agency of said gyroscope I permit compressed air to be admitted into a main or steering cylinder at either side of the piston therein, so as to turn the rudder to starboard or to port as may be required to maintain the vessel upon its course.

I have discovered that if the motive fluid be admitted by the gyroscope freely and without modification to one side of the steering cylinder, the result is to throw the rudder or other steering device through such a wide angle to starboard or to port that the vessel tends to move out of its course, whereupon through the action of the gyroscope the motive fluid is admitted to the other end of the steering cylinder and the rudder is thereupon thrown through a wide angle in the opposite direction, thus moving the vessel off its course in the opposite direction. The result is that the vessel tends to move in a sinuous path, the general direction or axis of which is or may be the desired predetermined direction.

I have therefore, in accordance with my invention, provided means to modify, limit or restrict the angle through which the rudder is moved through each functioning of the gyroscope, thus avoiding the movement of the vessel upon a sinous course and maintaining it accurately in its predetermined path.

Referring more particularly to the drawings, wherein I have represented merely one embodiment of means for carrying out my invention, I have therein represented a cylinder 1, adapted to receive motive fluid, such as compressed air, through a pipe 2 from a main reservoir or supply 3 positioned at any suitable point upon the vessel. Within the cylinder 1 is a piston 4, having a piston rod 5 extending entirely through the cylinder 1 and constituting the core of solenoids 6, 7. Air under pressure is admitted from the reservoir 3 to one side or the other of the piston 4 in cylinder 1, depending upon the energization of the solenoids 6 or 7. If the solenoid 6 be energized the piston 4 is moved to the left, viewing Fig. 1, and air is admitted through pipe 2 to the right-hand end of the cylinder 1, and, conversely, upon energization of the solenoid 7 it is admitted to the left-hand end thereof. I have herein represented the employment of coil springs 8, 9 within the cylinder 1 about the piston rod 5 thereof, tending to center the piston 4, and I have also represented the piston rod 5 as grooved or channelled at 10, 11 to provide for exhaust from the cylinder 1. Any other suitable means providing exhaust may be employed, the represented means being of simple construction.

Figures 1, 2, 3, 4, 5:
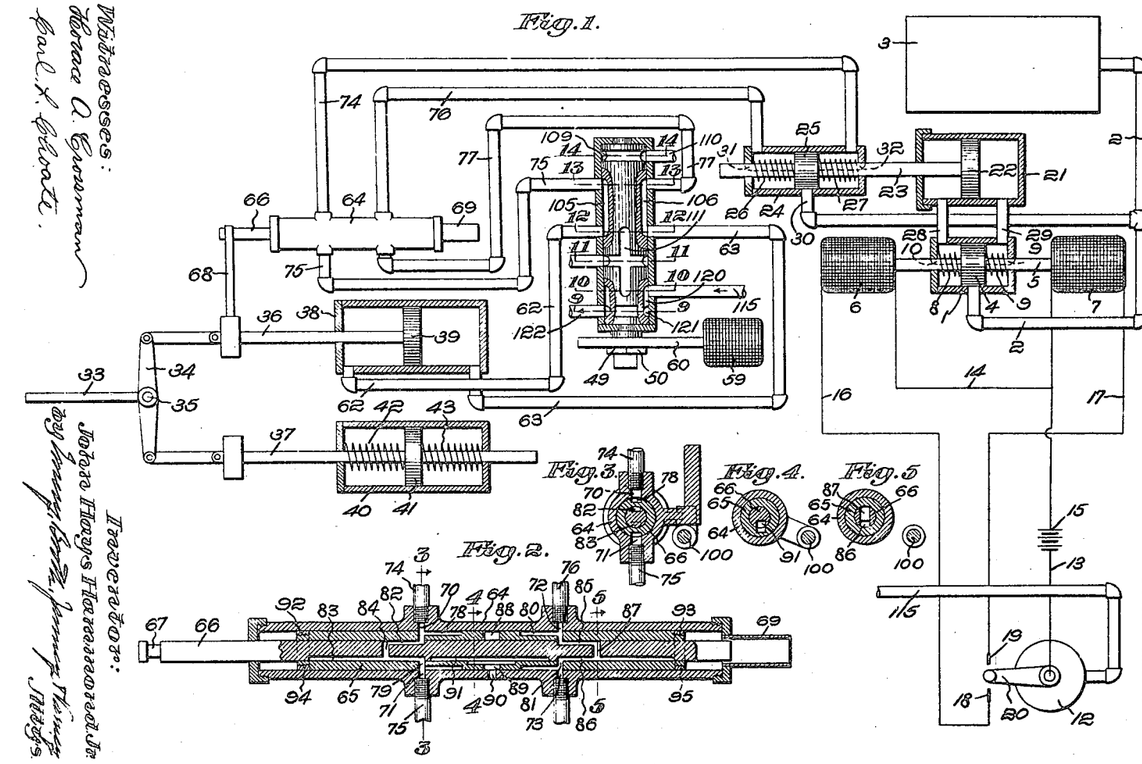
Fig. 1 is a view, mainly diagrammatic and partially in section, of a system constructed in accordance with and embodying one type of my invention, the gyroscope being represented as functioning in the control of the vessel.
Fig. 2 is a view, mainly in longitudinal section, of one type of means for modifying the action of the gyroscope or other controller upon the moving body.
Figs. 3, 4 and 5 are cross sections, upon the lines 3—3, 4—4 and 5—5, respectively, of Fig. 2.
Figure 6:
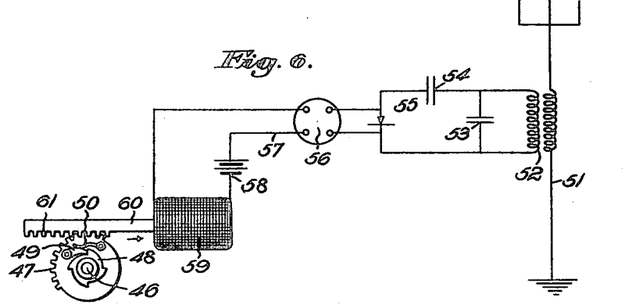
Fig. 6 is a view, mainly diagrammatic, of one type of means responsive to radiant energy for operating the valve means controlling the flow of motive fluid.

I have diagrammatically indicated the gyroscope at 12, it being equipped with suitable means to effect the energization of solenoids 6 and 7. It will, however, be understood that any means, electrical or otherwise, may be employed to effect upon apparent opposite movements of the gyroscope the passage of motive fluid in one direction or the other, or in any other suitable manner the control of the rudder mechanism. Preferably, however, and as herein represented, I employ electrical means including the solenoids 6 and 7.

The gyroscope 12 is in circuit by conductors 13, 14 with the solenoids 6 and 7, a battery 15 being represented in said circuit. Extending from said solenoids are conductors 16, 17 having terminals 18, 19 positioned in sufficient proximity to an arm 20 mounted upon the gyroscope and which, in the movement of the vessel relative to the gyroscope, makes contact with one or the other of said terminals 18, 19 and thereupon energizes the corresponding solenoid 6 or 7 as the case may be, thus moving the piston 4 toward one end or the other of the cylinder 1 and admitting air or other motive fluid to the opposite end of said cylinder 1.

In suitable relation to the cylinder 1 I preferably provide a further cylinder 21, having therein a piston 22 upon a piston rod 23 extending into and preferably through a cylinder 24, wherein it is provided with a piston 25 and coil springs 26, 27 tending to maintain a central position of said piston 25.

The corresponding ends of the cylinders 1 and 21 are connected by passages 28, 29, thereby admitting motive fluid from the cylinder 1 to one or the other of the cylinder 21, and thereby to move the piston 25 toward one end or the other of the cylinder 24, thus uncovering the passage 30 by which air under pressure is admitted from the main air supply or reservoir 3. Any suitable means may be employed to exhaust the air from either end of the cylinder 24. For the purpose I have herein represented the piston rod 23 as grooved or channelled at 31, 32.

The rudder of the vessel is diagrammatically indicated at 33, it being mounted upon a lever 34, pivoted at 35 and having connected thereto in suitable manner piston rods 36, 37, the former extending into the main or steering cylinder 38, where it is provided with a suitable piston 39. The piston rod 37 extends into and preferably through a so-called spring cylinder 40, where it is provided with a suitable piston 41. Surrounding the piston rod 37 and upon opposite sides of the piston 41 are coil springs 42, 43 which tend to center the piston 41 in the cylinder 40, and the piston 39 in the main steering cylinder 38.

Between the main or steering cylinder 38 and the cylinder 24 I interpose, in accordance with the disclosed embodiment of my invention, two functioning devices through the action of one of which I either permit the gyroscope to function in the control of the vessel or permit the operator at the distant control station to steer the vessel; and through the other of which I modify the helm angle or angle through which the rudder moves when the vessel is controlled by the gyroscope and not by the operator at the distant control station. Preferably the construction of parts is such that when the gyroscope is functioning in the control of the vessel the modifying device functions to limit the helm angle, and when the gyroscope is not functioning the said modifying means is rendered inactive and the rudder is moved through a wider and preferably through a full angle, through the means responsive to the distant control station.

I shall first describe one form of means whereby I permit the control of the vessel either by the gyroscope or by the operator at the distant control station. While any suitable means may be employed for this purpose, I preferably provide valve mechanism. Such valve mechanism, while it may be of any suitable type, is preferably a rotary valve of the general type and construction disclosed in prior applications filed by me.

In Figs. 1, 6, 7 and 8 I have represented the valve casing at 44, it having positioned therein a suitable valve 45 having a spindle 46 extending through the casing. Upon said spindle is loosely mounted a gear 47 and fast thereon is a ratchet 48, with which engages a pawl 49 upon the gear 47 and held in position by a spring 50. In this or in any other suitable manner the valve 45 is rotated step by step.

I impart a step by step movement to the said valve 45 by means responsive to the distant control station. For this purpose I have represented an open oscillatory receiving circuit at 51, this being connected to the winding 52 of a closed oscillatory circuit of any suitable type and shown as having therein a condenser 53, a stopping condenser 54, and a suitable detector 55 for electrical oscillations. At 56 I have indicated a sensitive relay or other contact making device. These parts may be of any suitable construction not herein necessary more fully to describe or to indicate. At 57 I have indicated a circuit controlled by the relay 56 and having therein a battery 58, and at 59 I have indicated a solenoid, the core or plunger 60 of which is adapted to be moved in the direction of the arrow upon Fig. 6, upon the energization of said solenoid. The said core or plunger 60 is provided with teeth 61 with which mesh the teeth of the gear 47, whereby upon energization of the solenoid 60 the rotary valve 45 is moved one step and as herein represented, through ninety degrees.

The left-hand end of the cylinder 38, viewing Fig. 1, is connected by passage 62 with the valve 45 at one side thereof and the right-hand end is connected by passage 63 with the said valve 45, preferably at the opposite side as represented most clearly in Fig. 1, whereby upon suitable actuation of the valve 45, the compressed air or other motive fluid is admitted to one end or the other of the cylinder 38 thereby to move the piston 39 to the right or the left, viewing said figure, and thence to turn the rudder 33 to starboard or to port. Before proceeding to describe in detail the internal construction of the valve 45, I will describe the represented embodiment of the rudder or helm angle modifying or limiting means.

Figures 9, 10, 11, 12, 13, 14, 15:
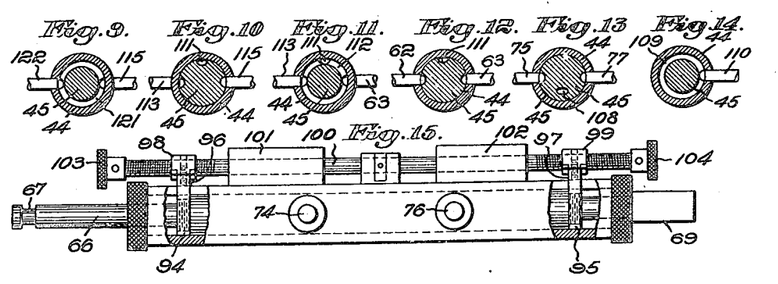
Figs. 9, 10, 11 and 12, 13, 14 are cross sections upon the corresponding lines of Figs. 7 and 8, respectively.
Fig. 15 is a plan view of the means for modifying the action of the gyroscope; and, Fig. 16 is a detail, in vertical section, of one form of means for effecting functioning of the gyroscope.

In Figs. 1, 2 and 15, I have represented one form of means for modifying, limiting or restricting the angle through which the rudder is moved when the course of the vessel is controlled by the gyroscope. For this purpose I preferably provide a cylinder 64 having mounted therein for sliding adjusting movement, a two-part shell or inner cylinder 65, within which latter is positioned a plunger 66, the end 67 of which is connected in suitable manner with the piston rod 36, as by a rod 68, shown in Fig. 1. The connection 68 compels conjoint movement of the plunger 66 and the piston rod 36. The plunger 66 extends preferably the entire length of the cylinder 64, the latter having at one end a guard or guiding tube 69 for the end of the plunger 66.

The said cylinder 64 is provided with four ports 70, 71, 72 and 73 with which communicate respectively the passages 74, 75, 76 and 77. The passages 74 and 76 communicate with opposite ends of the cylinder 24 and the passages 75 and 77 communicate with the valve 45, preferably at diametrically opposite points.

The two-part shell or cylinder 65 is provided at one portion thereof with an elongated port 78 in communication with the port 70 and diametrically opposite therefrom with a port 79 in communication with the port 71. At its opposite portion, the said two-part shell or cylinder is provided with an elongated port 80 in communication with port 72 and diametrically opposite thereto from a port 81 in communication with the port 73. Each of said ports 78, 79, 80 and 81 extends through the wall of the two-part shell or cylinder 65 and is thus adapted to be placed at the desired times in register with passages in the plunger 66. I have herein represented said plunger as provided in proximity to the ports 78, 79 with a groove 82 and diametrically opposite thereto a longer groove 83, which are in communication through a transverse passage 84, whereby at proper times the ports 70 and 71 are placed in communication. Similarly and adjacent to the ports 72, 73 the plunger 66 is provided with a longitudinal groove 85 and diametrically opposite thereto with a groove 86, which are placed in communication by a transverse groove 87, whereby the ports 72, 73 may be placed in communication at proper times. The shell or cylinder 65 intermediate the ports 70, 72 of the cylinder 64, is circumferentially divided, as indicated at 88, 89, thereby in effect forming a port 89, which latter is adapted to be placed in register at the desired times with the exhaust port 90 of the cylinder 64. The plunger 67 intermediate the ports 84, 87 is provided with a groove 91 of sufficient length to place either port 71 or 73 in communication with the exhaust port 90.

I provide suitable means for effecting longitudinal adjustment of the two parts or members of the shell or cylinder 65, whereby the points of communication of the grooves 78, 79, 80 and 81 may be varied, thus placing the corresponding ports 70, 71 and 72, 73 in communication at different portions of the movement of the plunger 66. Any suitable means may be provided for this purpose. I have herein represented the opposite ends 92, 93 of said two-part shell or cylinder 65 as threaded and receiving internally threaded collars 94, 95 which, as shown in Fig. 15, are provided with extensions 96, 97 secured to nuts 98, 99 mounted upon a threaded adjusting rod 100 slidingly mounted in suitable bearings 101, 102 and provided at opposite ends with adjusting heads 103, 104. In this or in any other suitable manner, the members of the shell or cylinder 65 may be moved axially of the cylinder 64 toward or from each other so as to control the time and period of communication of the ports 70, 71 and 72, 73 respectively.

Figures 7, 8:
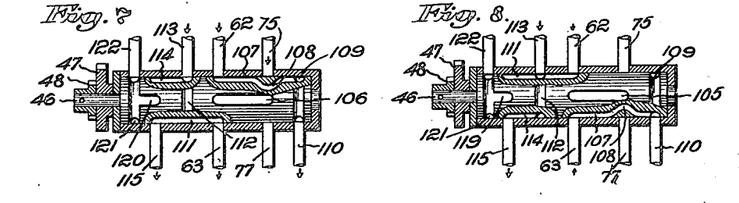
Figs. 7 and 8 are views, mainly in vertical section, of said valve means when the vessel is being controlled from a distance.
Figure 16:
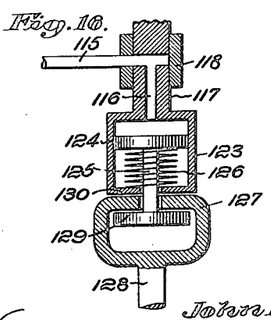

The rotary valve 45, as shown most clearly in Figs. 1, 7 and 8, is provided at preferably diametrically opposite points with grooves 105, 106 adapted, as shown in Fig. 1, to be placed respectively in communication with the passages 75, 62 and 77, 63, thereby, as indicated in Fig. 1, permitting the flow of fluid through the pipes 75 and the pipes 62 into the left hand end of the cylinder 38 or permitting the flow of fluid through the passage 77 and the passage 63 into the right hand end of said cylinder 38. Between the grooves 105, 106 the valve is provided with a groove 107 shown in two opposite positions in Figs. 7 and 8. Between its ends, the said groove 107 passes from the surface of the valve into the inner portion thereof, as represented at 108 in Figs. 7 and 8. At its inner end, the groove 107 is adapted to be placed in communication with either the passage 62 or the passage 63 depending upon the position of the valve and as represented in Figs. 7 and 8. The opposite or outer end of said passage 107 is in communication with a groove 109, itself communicating with the exhaust 110. The said valve 45 is also provided with a longitudinal groove 111, which is in communication with a circumferential groove 112, which, as represented in Figs. 1, 7 and 8, is in communication with the passage 113 leading from the main air supply reservoir 3. Also extending from the circumferential groove 112 is a longitudinal passage 114, which, as shown in Fig. 8, is adapted to be placed in communication with a passage 115 leading to an axial passage 116 in the upper portion 117 of the gyroscope rod, represented as mounted in the case 118. Between the longitudinal passages 111 and 114 of the rotary valve 45 are two longitudinal passages 119 and 120, both communicating at their outer ends with a circumferential groove 121 in communication with an exhaust 122. The gyroscope rod is formed of two parts adapted to be suitably clutched together, as shown in Fig. 16. The upper part 117 is enlarged to provide a casing or chamber 123 having a piston 124, the piston rod 125 of which is surrounded by a coil spring 126 and extends into a hollow head or casing 127 of the lower part 128 of the gyroscope rod and is there provided with a clutching disk 129. The construction is such that when air or other motive fluid under pressure is admitted into the passages 115, 116, the piston 124 is forced downwardly and the clutch disk 129 is forced out of clutching engagement with the surface of the hollow head or casing 127. When, however, the air or other motive fluid is permitted to exhaust from the passages 116, 115, then the coil spring 126 elevates the plunger 124 and forces the disk 129 into clutching engagement with the inner surface of the hollow head 127 of the gyroscope rod 128 and also moves the said head into clutching engagement with the under surface 130 of the casing or chamber 123, thereby permitting the gyroscope to function in its control of the vessel. If desired, the clutching surfaces may be roughened or otherwise suitably shaped to insure a clutching engagement of the parts.

Assuming that the gyroscope is functioning in the control of the vessel and that the arm 20 thereof makes contact with the terminal 18, the solenoid 6 will be energized and the piston 4 moved toward the left hand end of the cylinder 1, thus admitting motive fluid from the reservoir 3 to the right hand end of the cylinder 1, and thence to the right hand end of the cylinder 21, thereby forcing the piston 25 in the cylinder 24 to the left, viewing Fig. 1, and admitting air or other motive fluid from the reservoir 3 into the right hand end of the cylinder 24. In this movement of the parts, air will be exhausted from the left hand end of the cylinder 21 through the passage 28 and through the groove 10 of the core or plunger 5. The compressed air from the right hand end of the cylinder 24 will pass through the passage 74 through the ports 70, 71 which are in communication, as represented in Fig. 2. thence through the passage 75 to the rotary valve 45, along the groove 105 thereof and thence through the passage 62 into the left hand end of the cylinder 38, as represented in Fig. 1. This will cause the piston 39 in said cylinder 38 to move to the right, viewing Fig. 1, and hence will turn the rudder 33 to port or to the left viewing the sheet. If now the compressed air thus admitted to the cylinder 38, were permitted to move the piston through its full stroke, that is, to act without restraint, it would move the rudder 33 through a wide angle which in practice may approximate 45°. This is open to the objections heretofore pointed out, and in order to prevent such action, I have provided the modifying means heretofore described. The action thereof is such that the described movement of the piston rod 36 to the right compels conjoint movement of the plunger 66 into the same direction.

which will cut off the compressed air that is being admitted through the passage 74 and the port 70 as soon as the transverse port 84 in the plunger 66 has moved sufficiently to the right viewing Fig. 2 to pass the port 70. The same movement of the plunger 66 brings the port 71 and the passage 75 into communication with the exhaust port 90 of the cylinder 64 through the groove 83, so that the air is at once or almost immediately after its admission into the left hand end of the cylinder 38 exhausted through the port 90 from the same end of the cylinder 38 at which it was admitted. Upon exhaustion of the air which compelled the movement of the piston 39 to the right, the centering springs 42, 43 in the cylinder 40 tends at once to restore the piston 39 to central position in the cylinder 38.

When the motive fluid is being admitted through the ports 70, 71 and thence through the passage 75, the rotary valve and the passage 62 to the left hand end of the cylinder 38, the ports 72, 73 are open to the exhaust through the cylinder 24; that is to say, when the motive fluid is admitted to the left hand end of the cylinder 38, it will be permitted to exhaust through the right hand end thereof through the passage 63, the groove 106 of the rotary valve, the passage 77, through the ports 73, 72 of the cylinder 64, and thence through the passage 76 to the left hand end of the cylinder 24, whence it is exhausted through the longitudinal groove in the piston rod 23.

If the arm 20 of the gyroscope makes contact with the terminal 19, the solenoid 7 is energized, and in a manner similar to that described the motive fluid is admitted to the right hand end of the cylinder 38 and exhausted from the left hand end thereof, thereby moving the rudder to starboard. Such movement is, however, modified and limited through the action of the described means, as already fully set forth.

I have stated that when the motive fluid is admitted to one side or the other of the piston 39 in the cylinder 38, it is exhausted from the cylinder 24. The exhaust occurs as described at the commencement of the movement, but as soon as the plunger 66 has moved a short distance, as, for example, when moving toward the right viewing Fig. 2, the port 72 is cut off from communication with the port 73, but said port 73 is at the same time brought into communication with the supplemental exhaust port 90 through the longitudinal groove 91. This permits a more prompt exhaust and through a much shorter passage. Correspondingly when the plunger 66 is moved toward the left, viewing Fig. 2, the ports 70 will be cut off from the ports 71, thus preventing further exhaust through said ports, but the port 71 will be placed in communication with the supplemental exhaust port 90 through the elongated groove 83.

I have described the motive fluid as admitted to the left hand end of the cylinder 38 and promptly exhausted from the same end. Inasmuch as the springs 42, 43 in the cylinder 40 tend to restore the plunger 39 to central position in the cylinder 38, the said piston 39 will now be moved to the left, viewing Fig. 1, and hence the plunger 66 will also be moved to the left, and therefore the port 70 will be again placed in communication with the port 71, and a further supply of motive fluid will be admitted to the left hand end of the cylinder 38 and the operation will be repeated so long as the gyroscope continues to make contact with the terminal 18. Thus, there will or may be a succession of slight movements or fluctuations of the piston 39, first in one direction and then in the other in one portion of the cylinder, and a corresponding movement thereof will occur in the other portion of the cylinder when contact is made by the gyroscope arm 20 with the terminal 19.

I have stated that if the gyroscope were permitted to control the movement of the rudder 33 without the employment of the limiting or modifying device, the rudder would move through a large angle, as, for example, through 45°. By the employment of suitable modifying means, such, for example, as the type herein disclosed, I am enabled to reduce the angle of movement to any desired extent, and as above set forth I have provided means whereby this movement can be varied through the longitudinal adjustment of the sleeve or shell 65. If desired, I may thus cut down the helm angle when the gyroscope is controlling the movement of the vessel to from 2° to 10°.

When the gyroscope is functioning as described in the control of the vessel, the air or other motive fluid under pressure which may have been previously applied to render the gyroscope inoperative is permitted to exhaust through the pipe 115, as indicated in Fig. 1, and thence passing through the rotary valve 45 is exhausted through the passage 122. This action occurs whenever the valve 45 is adjusted to put the craft under the control of the gyroscope.

If the operator at the distant control station wishes to assume control of the vessel and to relieve the same from the control of the gyroscope 12, a suitable impulse is sent and the valve 45, which, during the control of the vessel by the gyroscope, has occupied the position shown in Fig. 1 (or a position at 180° therefrom), is turned 90° to the position shown in Fig. 7, or to that shown in Fig. 8. Assuming that the valve is turned into the position shown in Fig. 7, it will be observed that the helm or rudder angle-modifying means shown in Fig. 2, is temporarily rendered inactive, inasmuch as the longitudinal passages 105 and 106 of the rotary valve 45 no longer place the pipes 75 and 62 and the pipes 77 and 63 in communication. During the control of the vessel from the distant control station, both ends of the cylinder 64 are in communication with the supplemental exhaust 90 thereof through elongated groove 91 and the similar groove 83 or 86, depending upon the position of the parts.

When the valve 45 is in the position shown in Fig. 7, the motive fluid is admitted directly from the main reservoir 3 through the passage 113 and thence through the cylindrical groove 112 and the longitudinal passage 111, where it is admitted to the passage 115 and hence unclutches the gyroscope and temporarily terminates the functioning thereof. At the same time, the motive fluid is admitted from the passage 111 to the passage 63, and hence to the right hand end of the main or steering cylinder 38, so that the rudder 33 is moved through a wide angle to starboard. At the same time, the motive fluid is exhausted from the left hand side thereof through the passage 62, which, as shown in Fig. 7, is in communication through the irregularly shaped passage 107, 108 with the exhaust 110. If, however, the rotary valve 45 be positioned as shown in Fig. 8, then air is admitted from the reservoir 3 through the passage 113 and thence through the passage 62 into the left hand end of the main or steering cylinder 38. At the same time, it is exhausted from the right hand end thereof through the passage 63, and through the irregularly shaped passages 107, 108 to the exhaust 110, whereby the rudder is moved through a wide angle to port.

Upon the termination of steering from the distant control station, the rotary valve 45 is turned through another step, and as herein disclosed through an angle of 90°, and the rudder angle-limiting means is again made active, but as the rudder has been moving through the full helm angle during the control of the vessel from shore, the plunger 65 is or may be at one extreme or the other of its movement. Whatever be its position, however, it will still be open to the supplemental exhaust port 90 at both ends through the groove 91, and the groove 83 or the groove 86, and therefore the two centering springs 42, 43 in the cylinder 40, at once restore the plunger 66 to central position and at the same time restore the piston 39 to central position in the cylinder 38, thus also restoring the rudder 33 to central position. In actual operation, the springs 42, 43 may not instantly restore the rudder 33 to central position, but may leave it a little to starboard or to port, whereupon the gyroscope 12, which is now permitted to function, will at once assume control of the vessel and admit motive fluid to the proper side of the piston 39 in the cylinder 38, as heretofore described.

Upon the termination of steering from the distant control station, both ends of the cylinder 38 are open to the exhaust, so that the springs 42, 43 are thereby permitted to restore the piston 19 to substantially central position in said cylinder, whereupon through the described action of the gyroscope, air is admitted to one end or the other of the said cylinder, thereby to impose what I may term the "fluctuating" movements upon the piston. The degree or extent of the fluctuating movements may be controlled in any suitable manner.

So far as I am aware, I am the first to provide mechanism to maintain a moving body upon a predetermined course and to provide means for modifying, regulating, limiting or restricting the steering or helm angle of such body, and desire therefore to claim the same broadly.

It should be understood that the term "modify," as used throughout the specification and claims, is used in the sense included by the terms "regulate," "limit" or "restrict to a limited extent," and is not intended to include such actions as "arresting," "terminating" or "nullifying," or other terms of like character. In other words, when the modifying of the gyroscopic action takes place, the gyroscope still continues in operation. This definition is given inasmuch as the modifying of the gyroscopic action by the mechanism herein set forth constitutes an important feature of the invention.

Having thus described one illustrative embodiment of my invention, I desire it to be understood that although specific terms are employed, they are used in a generic and descriptive sense and not for purposes of limitation, the scope of the invention being set forth in the following claims.

Claims—

1. A system for the control of moving bodies at a distance by radiant energy including in combination, a body to be propelled, steering means thereon, means active upon said steering means to maintain a predetermined or definite direction of bodily movement of said body, and means to modify the action of said direction-maintaining means upon said steering means and means operative to overcome the effect of said modifying means and to steer said body selectively through any part of an unlimited angle with respect to said direction.

2. A system for the control of moving bodies at a distance by radiant energy including in combination, a body to be propelled, steering means thereon, means active upon said steering means to maintain a predetermined or definite direction of bodily movement of said body, means to limit the angle of movement of the steering means and means operative to render said angle limiting means ineffective and to steer said body selectively through any part of an unlimited angle with respect to said direction.

3. A system for the control of moving bodies at a distance by radiant energy including in combination, a body to be propelled, steering means thereon, means active upon said steering means to maintain a predetermined or definite direction of bodily movement of said body, means to modify the action of said direction-maintaining means upon the steering means, and means responsive to radiant energy from a distance to control the action of said modifying means and to steer said body selectively through any part of an unlimited angle with respect to said direction.

4. A system for the control of moving bodies at a distance by radiant energy including in combination, a body to be propelled, steering means thereon, means active upon said steering means to maintain a predetermined or definite direction of bodily movement of said body, means to reduce the angle of movement of said steering means below that which would be imposed by the normal action of said direction-maintaining means, and means responsive to radiant energy from a distance to control the action of said angle reducing means.

5. A system for the control of moving bodies at a distance by radiant energy including in combination, a body to be propelled, steering means thereon, means active upon said steering means to maintain a predetermined or definite direction of bodily movement of said body, fluid pressure means to modify the action of said direction-maintaining means upon the steering means, and means responsive to radiant energy from a distance to control the action of said fluid pressure actuated modifying means.

6. A system for controlling the operation of moving bodies at a distance by radiant energy including in combination, a body to be propelled, steering means thereon, a gyroscope, fluid pressure means controlled by said gyroscope and normally automatically operative to maintain a definite direction of movement of said body, and means to modify the action of said gyroscope upon the steering means and operative to steer said body selectively either in one direction or in an opposite direction from said first mentioned direction.

7. A system for controlling the operation of moving bodies at a distance by radiant energy including in combination, a body to be propelled, steering means thereon, a gyroscope, fluid pressure means controlled by said gyroscope and normally automatically operative to maintain a definite direction of movement of said body, and means responsive to radiant energy from a distance to modify the action of said gyroscope, and to steer said body selectively either in one direction or in an opposite direction from said first mentioned direction.

8. A system for controlling the operation of moving bodies at a distance by radiant energy including in combination, a body to be propelled, steering means thereon, a gyroscope, fluid pressure means controlled by said gyroscope to govern the action of said steering means, and helm angle reducing means controlled by said gyroscope.

9. A system for controlling the operation of moving bodies at a distance by radiant energy including in combination, a body to be propelled, steering means thereon, a gyroscope, fluid pressure means controlled by said gyroscope to govern the action of said steering means, helm angle reducing means between the gyroscope and the steering means, and means responsive to radiant energy from a distance to control the action of said helm angle reducing means.

10. A system for controlling the operation of moving bodies at a distance by radiant energy including in combination, a body to be propelled, steering means thereon, fluid pressure means, means active upon said fluid pressure means to maintain a predetermined or definite direction of bodily movement of said body, and means to modify the action of said direction-maintaining means upon said steering means to cause said body to deviate selectively through any part of an unlimited angle from said direction.

11. A system for controlling the operation of moving bodies at a distance by radiant energy including in combination, a body to be propelled, steering means thereon, fluid pressure means, means active upon said fluid pressure means to maintain a predetermined or definite direction of bodily movement of said body, and means responsive to radiant energy from a distance to modify the action of said direction maintaining means to cause said body to deviate selectively through any part of an unlimited angle with respect to said direction.

12. A system for controlling the operation of moving bodies at a distance by radiant energy including in combination, a body to be propelled, steering means thereon, fluid pressure means to control said steering means, a gyroscope governing the action of said fluid pressure means, means to modify the normal action of said gyroscope upon said steering means, and step-by-step means responsive to radiant energy from a distance to control the action of said modifying means.

13. A system for controlling the operation of moving bodies at a distance by radiant energy, including in combination, a body to be propelled, steering means thereon, fluid pressure means to control said steering means, a gyroscope governing the action of said fluid pressure means, means to modify the normal action of said gyroscope upon said steering means, and a rotary valve having actuating means responsive to radiant energy from a distance to control the action of said modifying means.

14. A system for controlling the operation of moving bodies at a distance by radiant energy, including in combination, a body to be propelled, steering means thereon and including a fluid pressure receiving chamber having a piston, means for admitting and for exhausting motive fluid from each side of the piston in said chamber, a gyroscope controlling such admission and exhaust, and supplemental exhaust means to reduce the helm angle which would be imposed by the normal action of said gyroscope.

15. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means to reduce the helm angle which would be imparted to the steering means by the normal action of said gyroscope, by exhausting motive fluid from said chamber.

16. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means to exhaust motive fluid from that side of the piston at which it was admitted in the governing action of said gyroscope, and thereby to reduce the helm angle below that which would be imposed by the normal action of said gyroscope.

17. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, and means to exhaust motive fluid from that end of said chamber to which it is admitted, without change in direction of movement of said piston to effect such exhaust, thereby to reduce the helm angle.

18. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means to reduce the helm angle which would be imparted to the steering means by the normal action of said gyroscope, by exhausting motive fluid from said chamber, and means responsive to radiant energy from a distance to govern the action of said helm angle reducing means.

19. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and valve means for effecting a supplemental exhaust from said chamber, and thereby to reduce the angle of movement which would be imparted to the steering means by the normal action of said gyroscope.

20. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, valve means for effecting a supplemental exhaust from said chamber, and thereby to reduce the angle of movement which would be imparted to the steering means by the normal action of said gyroscope, and means responsive to radiant energy from a distance to control the action of said valve means.

21. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, valve means for effecting a supplemental exhaust from said chamber, and thereby to reduce the angle of movement which would be imparted to the steering means by the normal action of said gyroscope, and a rotary valve governing the action of said valve means.

22. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means to effect fluctuating action of said piston, and thereby to limit the helm angle.

23. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means to effect fluctuating action of said piston, and thereby to limit the helm angle, and means responsive to radiant energy to control the action of said means for effecting fluctuating action of the piston.

24. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means to impose fluctuating movements upon said piston or to permit wide helm angle movement thereof.

25. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means under the control of radiant energy from a distance to impose fluctuating movements upon said piston.

26. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means responsive to radiant energy from a distance periodically to impose fluctuating movements upon the piston and periodically to permit wide helm angle movements thereof.

27. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, supplemental exhausting means to impose fluctuating movements upon the piston, and step-by-step means controlled by radiant energy from a distance to govern the action of said supplemental exhaust.

28. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means to impose fluctuating movements upon said piston while the body is controlled by the gyroscope.

29. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means to impose fluctuating movements upon said piston while the body is controlled by the gyroscope, and means responsive to radiant energy from a distance to terminate the functioning of the gyroscope.

30. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means to impose fluctuating movements upon said piston while the body is controlled by the gyroscope, and means responsive to radiant energy from a distance to terminate the functioning of the gyroscope and to permit wide helm angle movement of said steering means.

31. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, solenoids adapted to be energized by said gyroscope in the control of said admission and exhaust, and means controlled through the action of said solenoids to impose fluctuating movement upon said piston.

32. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, solenoids adapted to be energized by said gyroscope, and means controlled by said solenoids to reduce the movement of said piston below that which would be imparted through the normal action of said gyroscope.

33. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, and means connected to said steering means to impose fluctuating movements upon the piston during the periods of its control by said gyroscope.

34. A system for controlling the operation of moving bodies at a distance by radiant energy including in combination, a body to be propelled, steering means thereon, and including a fluid pressure receiving chamber having a piston, means for admitting and for exhausting motive fluid from each side of the piston in said chamber, a gyroscope controlling such admission and exhaust, and a plunger operatively connected to said piston to effect a supplemental exhaust from said cylinder.

35. A system for controlling the operation of moving bodies at a distance by radiant energy including in combination, a body to be propelled, steering means thereon, and including a fluid pressure receiving chamber having a piston, means for admitting and for exhausting motive fluid from each side of the piston in said chamber, a gyroscope controlling such admission and exhaust, and a plunger operatively connected to said steering means to exhaust motive fluid from that side of said piston to which it was last admitted through the action of said gyroscope.

36. A system for controlling the operation of moving bodies at a distance by radiant energy including in combination, a body to be propelled, steering means thereon, and including a fluid pressure receiving chamber having a piston, means for admitting and for exhausting motive fluid from each side of the piston in said chamber, a gyroscope controlling such admission and exhaust, a plunger operatively connected to said steering means to exhaust motive fluid from that side of said piston to which it was last admitted through the action of said gyroscope, and means responsive to radiant energy from a distance to neutralize the action of said plunger.

37. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, a plunger operatively connected to said steering means, and means controlled by said plunger to effect a supplemental exhaust from either side of said piston.

38. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, a plunger operatively connected to said steering means, means controlled by said plunger to effect a supplemental exhaust from either side of said piston, and step-by-step means responsive to radiant energy from a distance to neutralize the action of said plunger.

39. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means responsive to radiant energy from a distance to impose fluctuating movements upon the piston while the body is under the control of said gyroscope and to permit wider movements of the steering means upon the termination of such gyroscope control.

40. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means responsive to radiant energy from a distance to impose fluctuating movements upon the piston while the body is under the control of said gyroscope and to permit wider movements of the steering means upon the termination of such gyroscope control, and means active upon the termination of the control of the body by radiant energy to restore the steering means substantially to central position.

41. A system for controlling the operation of moving bodies at a distance by radiant energy including in combination, a body to be propelled, steering means thereon and including a fluid pressure receiving chamber having a piston, means for admitting and for exhausting motive fluid from each side of the piston in said chamber, a gyroscope controlling such admission and exhaust, means to impose fluctuating movements upon the piston while the body is under the control of said gyroscope, and means to vary the degree of said fluctuating movements.

42. The combination with a movable body, of automatic means carried thereby to stabilize said body with respect to a given axis, means operative to restrict the effective action of said automatic means on said body, and means responsive to energy transmitted from a distant point to terminate the automatic control of said body by said stabilizing means and said restricting means and to rotate said body selectively about said axis through any part of an unlimited angle.

43. The combination with a movable body, of automatic means carried thereby to stabilize said body with respect to a given axis, means operative to restrict the effective action of said automatic means on said body, and means responsive to energy transmitted from a distant point to modify the automatic control of said body by said stabilizing means and said restricting means and to rotate said body selectively about said axis through any part of an unlimited angle.

44. The combination with a movable body, of automatic means carried thereby to stabilize said body with respect to a given axis, means operative to restrict the effective action of said automatic means on said body, and means responsive to energy transmitted from a distant point to terminate the automatic control of said body by said stabilizing means and said restricting means and to rotate said body selectively about said axis in one direction or in an opposite direction.

45. The combination with a movable body, of automatic means carried thereby to stabilize said body with respect to a given axis, means operative to restrict the effective action of said automatic means on said body, and means responsive to energy transmitted from a distant point to modify the automatic control of said body by said stabilizing means and said restricting means, and to rotate said body selectively about said axis in one direction or in an opposite direction.

46. The combination with a movable body, of automatic means carried thereby to stabilize said body with respect to a given axis, means operative to restrict the effective action of said automatic means on said body, and means responsive to energy transmitted from a distant point to terminate the control of said body by said stabilizing means and said restricting means, and to rotate said body selectively about said axis in one direction or in an opposite direction and through any part of an unlimited angle in either direction.

47. The combination with a movable body of automatic means including a gyroscope carried thereby to stabilize said body with respect to a given axis, means operative to restrict the effective action of said gyroscope on said body, and means responsive to radiant energy transmitted from a distant point to modify the control of said body by said stabilizing means and said restricting means, and to rotate said body about said axis selectively through any desired part of an unlimited angle.

48. The combination with a movable body, of automatic means including a gyroscope carried thereby to stabilize said body with respect to a given axis, means operative to restrict the effective action of said gyroscope on said body, and means responsive to radiant energy transmitted from a distant point to modify the control of said body by said stabilizing means and to rotate said body about said axis selectively in either direction.

49. The combination with a vessel provided with a rudder arranged to oscillate with respect thereto, of direction maintaining means automatically operative to control the movement of said rudder to maintain the said vessel upon a definite course, means to limit the angle of oscillation of said rudder while under the automatic control of said direction maintaining means, and means operative to overcome the action of said limiting means, and to oscillate said rudder selectively either in one direction or in an opposite direction.

50. The combination with a vessel provided with a rudder arranged to oscillate with respect thereto, of direction maintaining means automatically operative to control the movement of said rudder to maintain the said vessel upon a definite course, means to limit the angle of oscillation of said rudder while under the automatic control of said direction maintaining means, and means responsive to radiant energy for overcoming the action of said limiting means and for oscillating said rudder selectively either in one direction or in an opposite direction.

51. A system for the control of moving bodies including, in combination, a vessel to be propelled, rudder means thereof, means active upon said rudder means to maintain a predetermined or definite direction of bodily movement of said vessel, and means to modify the action of said direction-maintaining means upon said rudder means whereby the vessel may be steered along any of said plurality of paths to starboard, or any of said plurality of paths to port.

52. A system for the control of moving bodies at a distance including, in combination, a body to be propelled, steering means thereon, means active upon said steering means to maintain a predetermined or definite direction of bodily movement of said body, and means including a rotatable controlling member to modify the effect of the action of said direction maintaining means upon said steering means.

53. A system for the control of moving bodies including, in combination, a body to be propelled, steering means thereon, means active upon said steering means to maintain a predetermined or definite direction of bodily movement of said body, and means including a step-by-step rotatable controlling member to modify the effect of the action of said direction-maintaining means upon said steering means.

54. A system for the control of moving bodies including, in combination, a body to be propelled, steering means thereon, means active upon said steering means to maintain a predetermined or definite direction of bodily movement of said body, and a fluid pressure controlled means to modify the action of said direction-maintaining means upon the body.

55. A system for the control of moving bodies, including in combination a body to be propelled, steering means thereon, a gyroscope active upon said steering means to maintain a predetermined or definite direction of bodily movement of said body by admitting a motive agent to act upon the steering means, and means quickly to release at least a portion of said admitted motive agent.

In testimony whereof, I have signed my name to this specification in the presence of two subscribing witnesses.

JOHN HAYS HAMMOND, Jr.

Witnesses:
  GEO. H. NEWELL,
  NELLIE M. LINNEKIN.